Dec. 20, 1949    J. P. CHERRIERE    2,492,033
FISHING FLOAT
Filed Aug. 1, 1947
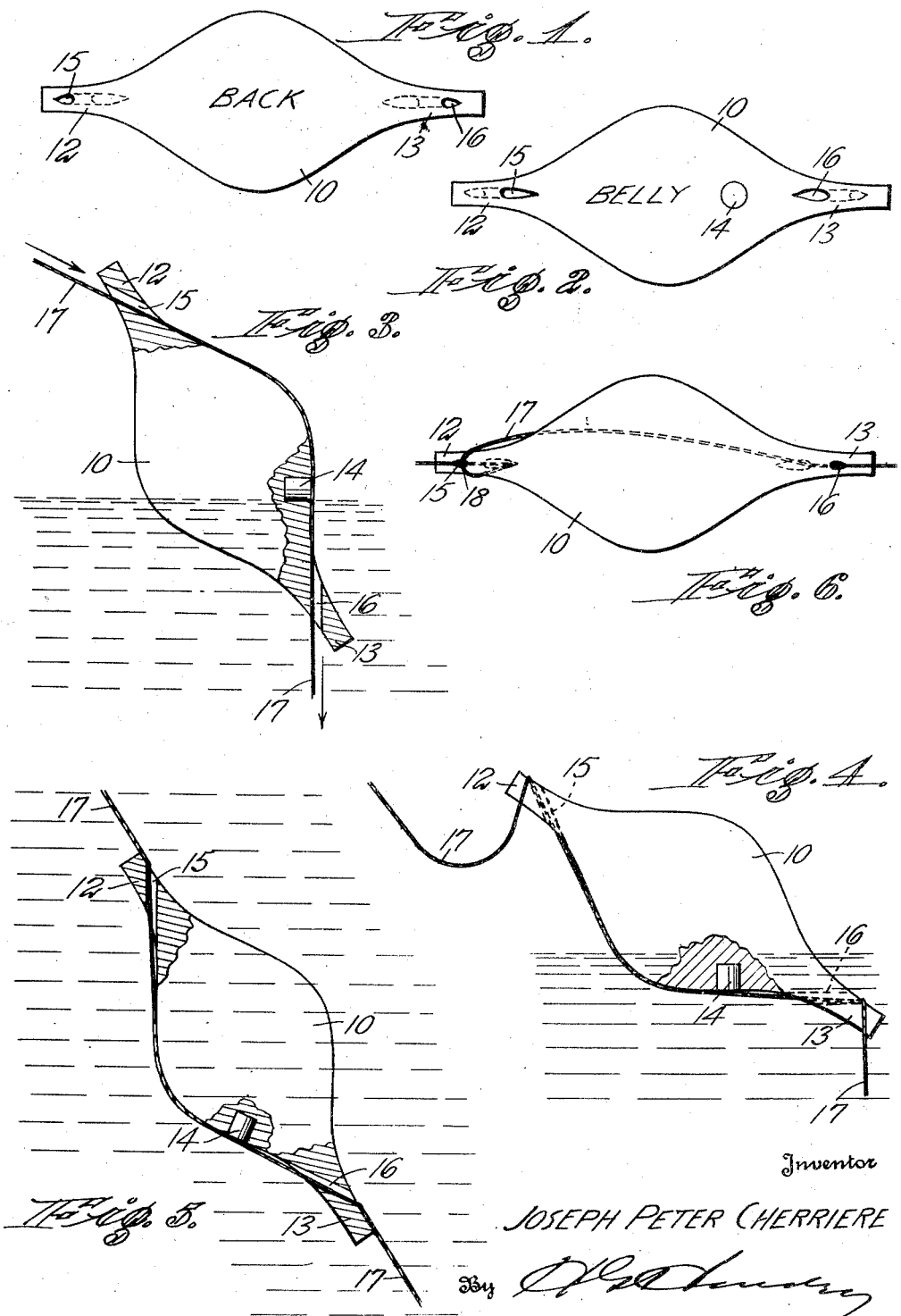
Inventor
JOSEPH PETER CHERRIERE Patented Dec. 20, 1949

2,492,033

UNITED STATES PATENT OFFICE 2,492,033

FISHING FLOAT

Joseph Peter Cherriere, Hamilton, Ontario, Canada

Application August 1, 1947, Serial No. 765,318

1 Claim. (Cl. 43—49)

This invention relates to improvements in fishing floats or bobs, and consists essentially of a float having through each of its end portions a guide passage through which the fishing line is led, these passages having their axes in a plane common to the longitudinal axis of the float and diverging from a point in this plane, and a ballast weight arranged closer to one end of the float than the other and disposed in said plane on the same side of the float as the said point of divergence.

In the art of still water angling it is well known that the baited hook should be suspended a foot or two off bottom, particularly at feeding time, also a few feet from the surface at other certain times of the day. In deep angling the hook is arranged on the line the proper distance above the sinker, it being intended that the sinker lie on the bottom and the line drawn taught by the reel or by the position of the rod when a float is not used. The use of the float is the best method, but when it is difficult to determine the depth of the water such as in irregular bottoms, particularly when the position of the line is constantly being altered in experiment, the fixed float is dispensed with as obviously being only of nuisance value.

The use of the float would also be of material advantage in still and deep water casting, but here again the fixed float would be of little purpose, and moreover casting with a float at any point along the line save close to the sinker would be impracticable and futile. Moreover, netting the catch would be extremely difficult.

The primary object of the present invention then, is to render both drop angling and cast angling with use of the float feasible by the provision of an automatic or self depth-adjusting float, that is to say, a float which will at all times automatically fix itself at the proper point in the line for all soundings, and furthermore, will automatically move adjacent the hook for casting.

Another important object is to provide a float of the character specified which by means of a simple manual maneuver may be temporarily placed at a fixed position on the line for "surface" fishing.

A third important object is to provide such a float which may be permanently attached to the line prior to the application of the leader and sinker, and there left to permanently remain for use in all the aforesaid fishing circumstances.

A fourth important object is to provide a float having the above characteristics which will register or bob at the slightest touch on the bait and submerge when the hook is taken.

A fifth important object is to provide a float embodying the above features which will be simple, highly practicable, durable, effective for its purpose, and simple and inexpensive to produce and to purchase.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is an elevation of the improved fishing float or bob as constructed in accordance with the present invention, at rest.

Figure 2 is an opposite elevation of the device, also at rest.

Figure 3 is a view of the bob afloat in the position it assumes while the line is paying out through the guide holes as the sinker sounds.

Figure 4 is a view of the bob afloat in the position it assumes while the sinker is on bottom.

Figure 5 is a view of the float or bob submerged in one position it may assume, either immediately after the hook is taken or, as the line is being reeled in under the load of the fish.

Figure 6 is an elevation of the float at rest showing the line arranged on it in the manner for use in "surface" fishing.

In its present embodiment the float or bob preferably comprises a bulbous middle portion 10, and diminutively reduced opposed and coaxial end portions, the lines of which are preferably sweepingly curved and uninterruptedly merged with those of the bulb.

When the float is water-borne it lists, as will later appear, and consequently these opposed reduced or more slender end portions or extensions to the body or bulbous portion 10 are disposed one uppermost and high into the air while the other is fully submerged. In order, therefore, to distinguish these identical end portions the aerial member may well be termed the peak 12 and the aquatile member the tail 13.

The bulb is provided with a flush ballast piece or weight 14 in a position roughly approximating the area of the mergence of the bulb and the tail. Although the float is symmetrical in its roundness, in consequence of this weight it may be said to be definitely divided into halves, one of which may well be termed the back (Figure 1) and the other the belly (Figure 2), and these are so labelled on the drawing. The weight 14, as is evident, is in the belly.

In the identical peak and tail are identical lead or guide passages 15 and 16, respectively, which are directed in accordance with the description in the preamble. As can be seen, the innermost edges of these passages are at tangent with the curvature of the bulb, and therefore the fishing line 17 which is threaded first through the passage 15 and finally through the passage 16, intermediately passing over the bulb on the median line of the belly, is free to pass almost frictionless through the float, or the float to slide long the line, under certain circumstances which will later appear. However, when the line is bent where it emerges from the outer entrance to one or both of the passages and pulled upon, it is not free to pass through and over the float, nor the float to slide along the line, but is resisted by friction applied at the point or points of the bend or bends in the line.

In drop fishing or casting, the float is first allowed to slide along the line until it is halted by coming into contact with the usual enlarged interruption in the line where the leader head is attached. In drop fishing it is customary to feed the line into the water by hand rather than dereeling it, such being considered the faster method. However, every angler has his preferred way of paying out. In casting, and casting of course here merely means tossing the bait by means of the rod a distance from location in deep water (as distinguished from fly or live bait casting in shallow running water) instead of simply dropping the line overboard from location, the line is reeled in until the float touches or at least comes close to the end guide on the pole, whereupon the pole is whipped.

When the sinker strikes the surface and then sounds the float of course remains water-borne, the line paying out freely through the passages and along the bulb, as well illustrated in Figure 3 which shows the line as it follows the sinker to the bottom. As the float strikes the water, in whatever position it may, the weight of the sinker in plumbing the line which in turn plumbs the passage in the tail, positions the float belly-up, but with a pronounced list, however. Thus the urge of the weight 14 to turn the float properly belly-down succumbs to the overwhelmingly greater weight of the bait sinker. With the float in this belly-up position it will be observed that the passage in the peak is directed substantially to where the source of the line would be, namely the end of the pole or the fisherman's hand, as the case might be, and that the line is free to pay out through the peak passage thence over the belly and finally through the plumb tail passage with but inconsequential frictional resistance. The payout might conveniently be compared to any weighted line passing over any smooth round surface instead of a grooved pulley.

When, however, the sinker strikes bottom and the line slacks, the weight 14 at once causes the float to roll over properly belly-down, as clearly shown in Figure 4. As the float thus rolls over the passage 16 which in the primary position is plumb becomes level, the still plumb line sharply bends and becomes partially snubbed about the tail, and there the line remains frictionally fast to the float. Furthermore, the sagging portion of the line between the float and the pole is snubbed about the peak. Thus the fisherman knows that the length of the submerged portion of the line at least approximates the depth of the water and that his bait resides at the proper level above bottom.

With a fish safely on the hook obviously a strain is at once put on the line which tightens it through the float passages and on its run over the belly of the float. Moreover, the portion of the line immediately free of the float stretches substantially parallel with the axis of the float and therefore is obliquely bent where it emerges from both passages, so at least some degree of frictional resistance is present, as will be observed in Figure 5, which shows the float fully submerged as when a hooked fish makes off.

Thus the float will remain in a fixed position on the line submerged or after breaking surface as the line is reeled in, until it reaches the end guide of the pole where it remains during the balance of the reeling operation. The float so remains and the line is free to pass because the hole in the peak automatically becomes coaxial with the end guide and the line straightened in its run past the peak and also the tail substantially as in Figure 3.

Thus the float does not in the least interfere with reeling, and it is evident that after the fish is dehooked and the hook rebaited the next cast may be made without handling the float in any way. In fact the float is nowise an obstructing influence, either during the reel-in, the subsequent cast, nor the interval between, and accordingly the float not only automatically maintains the bait at the proper level but also makes fishing with a float possible in circumstances wherewith the use of a float was hitherto entirely impracticable.

At such times when it is desired to fish the surface, the float may be made fast to the line at any given point by simply forming a half-hitch 18 over the peak, as in Figure 6.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

I claim:

A fishing float having a bulbous body and greatly reduced ends each provided with a passage for a fish line, said passages having axes lying in a plane common to the longitudinal axis of said body and ends, said passage axes diverging from a point in said plane exterior to said body, and a ballast weight arranged closer to one end of the float than the other and having its axis in said plane, said weight lying on the same side of the body axis as the point of divergence of said passage axes.

JOSEPH PETER CHERRIERE.

REFERENCES CITED

The following references are of record in the file of this patent:

UNITED STATES PATENTS

| Number | Name | Date |
| --- | --- | --- |
| 261,505 | Wilson | July 18, 1882 |
| 942,597 | Teasdale | Dec. 7, 1909 |
| 1,243,881 | Sanford et al. | Oct. 23, 1917 |
| 1,918,507 | Westling | July 18, 1933 |
| 2,274,596 | Fink | Feb. 24, 1942 |